US007793209B2

(12) United States Patent
Kikuchi

(10) Patent No.: US 7,793,209 B2
(45) Date of Patent: Sep. 7, 2010

(54) ELECTRONIC APPARATUS WITH A WEB PAGE BROWSING FUNCTION

(75) Inventor: Masaaki Kikuchi, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1114 days.

(21) Appl. No.: 11/471,299

(22) Filed: Jun. 20, 2006

(65) Prior Publication Data
US 2007/0006067 A1    Jan. 4, 2007

(30) Foreign Application Priority Data
Jun. 30, 2005    (JP)    ............... 2005-192836

(51) Int. Cl.
G06F 15/177    (2006.01)
G06F 17/30    (2006.01)
(52) U.S. Cl. ................. 715/205; 715/234; 715/738; 707/602; 707/706; 709/203; 709/217
(58) Field of Classification Search ........... 715/200, 715/205, 234, 236, 201, 231, 273, 738, 739, 715/860; 707/3, 6, 100, 602, 705, 706, 707, 707/708, 709, 710, 713, 721, 726, 727, 729, 707/738, 751, 752, 754, 768, 769, 805; 709/203, 709/217, 218, 219
See application file for complete search history.

(56) References Cited
U.S. PATENT DOCUMENTS
6,049,812 A * 4/2000 Bertram et al. ............. 715/205

6,178,419 B1 * 1/2001 Legh-Smith et al. ........... 707/6
6,253,208 B1 * 6/2001 Wittgreffe et al. ......... 707/104.1
6,310,630 B1 * 10/2001 Kulkarni et al. ............. 715/776
6,460,060 B1 * 10/2002 Maddalozzo et al. ........ 715/234
6,670,968 B1 12/2003 Schilit et al.

(Continued)

FOREIGN PATENT DOCUMENTS
EP    1 107 099 A2    6/2001

(Continued)

OTHER PUBLICATIONS

Xie et al "Efficient Browsing Of Web Search Results On Mobile Devices Based On Block Importance Model", IEEE, Mar. 2005, , 10 pages.*

(Continued)

Primary Examiner—Laurie Ries
Assistant Examiner—Maikhanh Nguyen
(74) Attorney, Agent, or Firm—Frishauf, Holtz, Goodman & Chick, P.C.

(57) ABSTRACT

A Web page browsing apparatus has stored keywords such as a "next" which is a clue to pass to a next page. When an "Advance" key of a key-in unit is operated, a HTML file of a Web page displayed presently on a display is searched for a character string which is used as a keyword to jump to a next page. When the character string is searched out, a URL written with the searched-out character string is extracted as a URL of a next page. A HTML file of a Web page represented by the extracted URL is acquired from a Web server accessed in accordance with the extracted URL and displayed as a Web page next to the presently displayed page.

4 Claims, 9 Drawing Sheets

U.S. PATENT DOCUMENTS

| | | | |
|---|---|---|---|
| 6,742,163 B1 * | 5/2004 | Ono et al. | 715/236 |
| 6,823,311 B2 * | 11/2004 | Tetsumoto | 704/270.1 |
| 6,976,070 B1 * | 12/2005 | Hoashi et al. | 709/224 |
| 7,010,581 B2 * | 3/2006 | Brown et al. | 709/218 |
| 7,035,909 B1 | 4/2006 | Lee et al. | |
| 7,047,489 B2 * | 5/2006 | Kanno et al. | 715/277 |
| 7,170,486 B2 * | 1/2007 | Lemel et al. | 345/156 |
| 7,188,307 B2 * | 3/2007 | Ohsawa | 715/205 |
| 7,225,410 B2 | 5/2007 | Kimmo et al. | |
| 7,240,061 B2 * | 7/2007 | Fukushima et al. | 707/100 |
| 7,418,654 B2 * | 8/2008 | Kondo et al. | 715/205 |
| 7,454,526 B2 * | 11/2008 | Brown et al. | 709/246 |
| 2002/0032745 A1 * | 3/2002 | Honda | 709/217 |
| 2002/0087515 A1 * | 7/2002 | Swannack et al. | 707/2 |
| 2002/0154159 A1 * | 10/2002 | Day et al. | 345/738 |
| 2002/0194216 A1 * | 12/2002 | Kanno et al. | 707/500.1 |
| 2003/0120649 A1 * | 6/2003 | Uchino et al. | 707/5 |
| 2003/0143979 A1 * | 7/2003 | Suzuki et al. | 455/406 |
| 2004/0083424 A1 * | 4/2004 | Kawai et al. | 715/501.1 |
| 2004/0205156 A1 | 10/2004 | Aarts et al. | |
| 2005/0171932 A1 * | 8/2005 | Nandhra | 707/3 |
| 2006/0059231 A1 * | 3/2006 | Takatori et al. | 709/206 |
| 2006/0074905 A1 * | 4/2006 | Yun et al. | 707/5 |
| 2007/0277089 A1 | 11/2007 | Kimmo et al. | |

FOREIGN PATENT DOCUMENTS

| | | | |
|---|---|---|---|
| JP | 10-222541 A | 8/1998 |
| JP | 10-326137 A | 12/1998 |
| JP | 2000-020465 A | 1/2000 |
| JP | 2000-187611 A | 7/2000 |
| JP | 2000-512783 A | 9/2000 |
| JP | 2000-311108 A | 11/2000 |
| JP | 2002-251245 A | 9/2002 |

OTHER PUBLICATIONS

Togawa et al. "Web Browsing Activity Visualization System For Administrator Assistance Using Users' Web Browsing Behavior", IEEE, 2004, 6 pages.*

Japanese Office Action (and English translation thereof) dated Aug. 5, 2008, issued in a counterpart Japanese Application.

Buyukkokten O., et al: Association for Computing Machinery: "Power Browser: Efficient Web Browsing for PDAS", CHI 2000 Conference Proceedings. Conference on Human Factors in Computing Systems, The Hague, Netherlands, Apr. 1-5, 2000, CHI Conference Proceedings, Human Factors in Computing Systems, New York, NY: ACM, US Apr. 1, 2000, pp. 430-437, XP001090105, ISBN: 0-201-48563-X.

* cited by examiner

| NO. | KEYWORD |
|---|---|
| 1 | NEXT |
| 2 | ADVANCE |
| 3 | PAGE |
| 4 | MORE |
| 5 | NEXT CHAPTER |
| 6 | NEXT SECTION |
| 7 | NEXT PARAGRAPH |
| 8 | CONTINUED |
| 9 | CONTINUATION |

| NO. | KEYWORD |
|---|---|
| 1 | CONTENTS |
| 2 | INDEX |
| 3 | LIST |
| 4 | COVER |

| ORDER | OPERATION | URL |
|---|---|---|
| 1 | BOOKMARK | www.asio.co.jp/index.htm |
| 2 | "ADVANCE" BUTTON | www.asio.co.jp/product_index.htm |
| 3 | CURSOR POINTER | www.asio.co.jp/product/a/index.htm |
| 4 | "ADVANCE" BUTTON | www.asio.co.jp/product/a/page01.htm |
| 5 | "ADVANCE" BUTTON | www.asio.co.jp/product/a/page02.htm |
| 6 | "ADVANCE" BUTTON | www.asio.co.jp/product/a/page03.htm |
| 7 | "ADVANCE" BUTTON | www.asio.co.jp/product/a/page04.htm |
| 8 | "ADVANCE" BUTTON | www.asio.co.jp/product/a/page05.htm |
| 9 | "ADVANCE" BUTTON | www.asio.co.jp/product/a/page06.htm |
| 10 | "ADVANCE" BUTTON | www.asio.co.jp/product/a/page07.htm |
| 11 | "ADVANCE" BUTTON | www.asio.co.jp/product_index.htm |
| | | |
| | | |
| | | |
| | | |

```
</HTML>

</HEAD>
      <TITLE>ARTICLE · APRIL 2005</TITLE>
  </HEAD>

<BODY bgcolor="#ffffff" text="#000000">

<HR>

<DIV align="center"><FONT size="+3">ARTICLE · APRIL 2005</FONT></DIV>
     <DIV align="right"><FONT size="2">LAST UP DATE 3/APRIL/2005</DIV>

<HR>

<CENTER>

<TABLE border="1">
           <CAPTION><BR><FONT color="#000000" size="+2">APRIL 3</FONT><BR></CAPTION>
           <TBODY>
             <TR bgcolor="#ffffff">
                <TD width="596" align="left">
                  <FONT color="#000000" size=+2"> · ○○○○○○○○○○○○。 </FONT><BR>
                  <FONT color="#000000" size=+2"> · ××××××。 </FONT><BR>
                  <FONT color="#000000" size=+2"> · △△△△△△△△△△△△△△△△。 </FONT><BR>
                  <FONT color="#000000" size=+2"> · □□□□□□□□□□□□。 </FONT><BR>
                  <FONT color="#000000" size=+2"> · ◎◎◎◎◎◎◎◎◎◎◎◎◎◎◎◎。 </FONT><BR>
                  <FONT color="#000000" size=+2"> · ▽▽▽▽▽▽。 </FONT><BR>
                </TD>
             </TR>
           </TBODY>
        </TABLE><BR><BR>
     </CENTER>

<P align="right"><FONT size="+2">PAGE 3</FONT><P>

<HR>

<P align="center"><FONT size="+2">
        <A href="http://www.asio.co.jp/product/a/page002.html">TO PRECEDING PAGE</A>       ─── Cx
        <A href="http://www.asio.co.jp/product/a/index.html">TO CONTENTS</A>              ─── Cz
        <A href="http://www.asio.co.jp/product/a/page004.html">TO NEXT PAGE</A>           ─── Cy
     </P></FONT>

<HR>

</BODY>

</HTML>
```

| NO. | FILE NAME |
|---|---|
| 1 | page0000.htm |
| 2 | page0002.htm |
| 3 | page0003.htm |
| 4 | page0010.htm |
| 5 | page0020.htm |
| 6 | page0030.htm |
| 7 | page00a0.htm |
| 8 | page00b0.htm |
| 9 | page00c0.htm |

| NO. | EXTRACTED KEYWORD | EXTRACTED URL |
|---|---|---|
| 1 | CONTENTS PAGE | ./000/index.htm |
| 2 | CHAPTER 1-2 PAGE | ./001/index.htm |
| 3 | CHAPTER 3 PAGE | ./003/index.htm |
| 4 | CHAPTER 4 PAGE | ./004/index.htm |
| 5 | CHAPTER 5 PAGE | ./005/index.htm |
| 6 | | |

| KEYWORD | W | X | Y | Z |
|---|---|---|---|---|
| CHAPTER W, SECTION X, SUBSECTION Y, PARAGRAPH Z | | | | |
| VOLUME X | | | | |
| PAGE X | | | | |

ELECTRONIC APPARATUS WITH A WEB PAGE BROWSING FUNCTION

CROSS-REFERENCE TO RELATED APPLICATIONS

This application is based upon and claims the benefit of priority from prior Japanese Patent Application No. 2005-192836, filed Jun. 30, 2005, the entire contents of which are incorporated herein by reference.

BACKGROUND OF THE INVENTION

1. Field of the Invention

The present invention relates to electronic apparatus and more particularly to such apparatus with a Web page browsing function for causing a Web page provided by a Web server to be displayed efficiently.

2. Description of the Related Art

Generally, in a Web browser of a mobile phone or a PC (Personal Computer), an URL (Uniform Resource Locater) to be accessed is directly inputted by a keyboard or an URL registered beforehand in a bookmark is selected, thereby accessing a Web server corresponding to the URL, acquiring a HTML file from the server and displaying a Web page of sentences and images.

Furthermore, a character string to which a URL that specifies the location of a next Web page is linked is displayed with an under bar or the color of the characters is changed so as to be discriminated from other character strings on a displayed Web page. The linked character string is clicked, for example, with a mouse to obtain a HTML file to display the next Web page.

"Back" and "Forward" buttons are prepared for the Web browser's functions to display the Web page immediately preceding the presently displayed Web page based on a record of the URLs stored as a history.

Recently, a plurality of Web pages are used to display a large amount of information such as, for example, review reports, introductions, diary pages, results of site retrievals and lists of commodities in shop sites because an increasing quantity of such information cannot be displayed on only one Web page.

Thus, in order to display a next Web page, a link button such as, for example shown by "to Next page", appearing somewhere on a page presently under display is found by scrawling and then clicked, thereby jumping to the next page, which is, however, a complicated operation.

Japanese Patent Publication Hei 10-326137 discloses a portable information collection apparatus that comprises an "Advance" key that can be repeatedly operated to sequentially read and display a large amount of information stored in the collection apparatus. This Publication, however, fails to disclose functions to sequentially obtain and display linked pages like Web pages easily and in good order.

It is therefore an object of the present invention to provide an electronic apparatus with a display screen on which respective Web pages can be switchingly displayed easily in good order without requiring any complicated operation even when the display screen is small.

BRIEF SUMMARY OF THE INVENTION

The present invention provides an electronic apparatus comprising a Web page browser for acquiring a file written in a markup language from a Web server on a network, thereby displaying a corresponding Web page. Then, a URL extractor retrieves a specified character string from the file and extracts a linked URL written with the specified character string. The Web page browser also accesses the linked URL extracted by the URL extractor to acquire a corresponding Web page. A next-page displaying unit then displays as a next page the Web page acquired by the URL extractor.

The present invention also provides an electronic apparatus comprising a Web page browser for acquiring a file written in a markup language from a Web server on a network, thereby displaying a corresponding Web page. Then a URL producing unit produces a URL of a candidate page to be displayed next from information written in the file. A reading unit beforehand reads a file of a Web page indicated by the URL produced by the URL producing unit. A determining unit then determines whether the file of the Web page read beforehand by the reading unit is appropriate as a next page to be displayed.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 illustrates the content of data stored in a next-page link search keyword memory prepared in a RAM of the terminal apparatus;

FIG. 4 illustrates the content of data stored in a contents-page link search keyword memory prepared in the RAM;

FIG. 5 illustrates the content of data stored in a history memory provided in the RAM;

FIG. 7 shows a HTML file written in HTML as a markup language which composes the Web page of FIG. 6;

FIG. 9 shows only file names of a plurality of URLs having a common directory, whose display is omitted, stored in the Web page displaying process performed in the first embodiment;

FIG. 10 shows an example of extracted URLs to which no URL to be next accessed can be selected from the file names of the URLs;

FIG. 11 shows the content of data stored in a link beforehand read keyword memory prepared in the RAM in a next page allocating process included in a Web page displaying process in a second embodiment.

DETAILED DESCRIPTION OF THE INVENTION

First Embodiment

Figure 1:
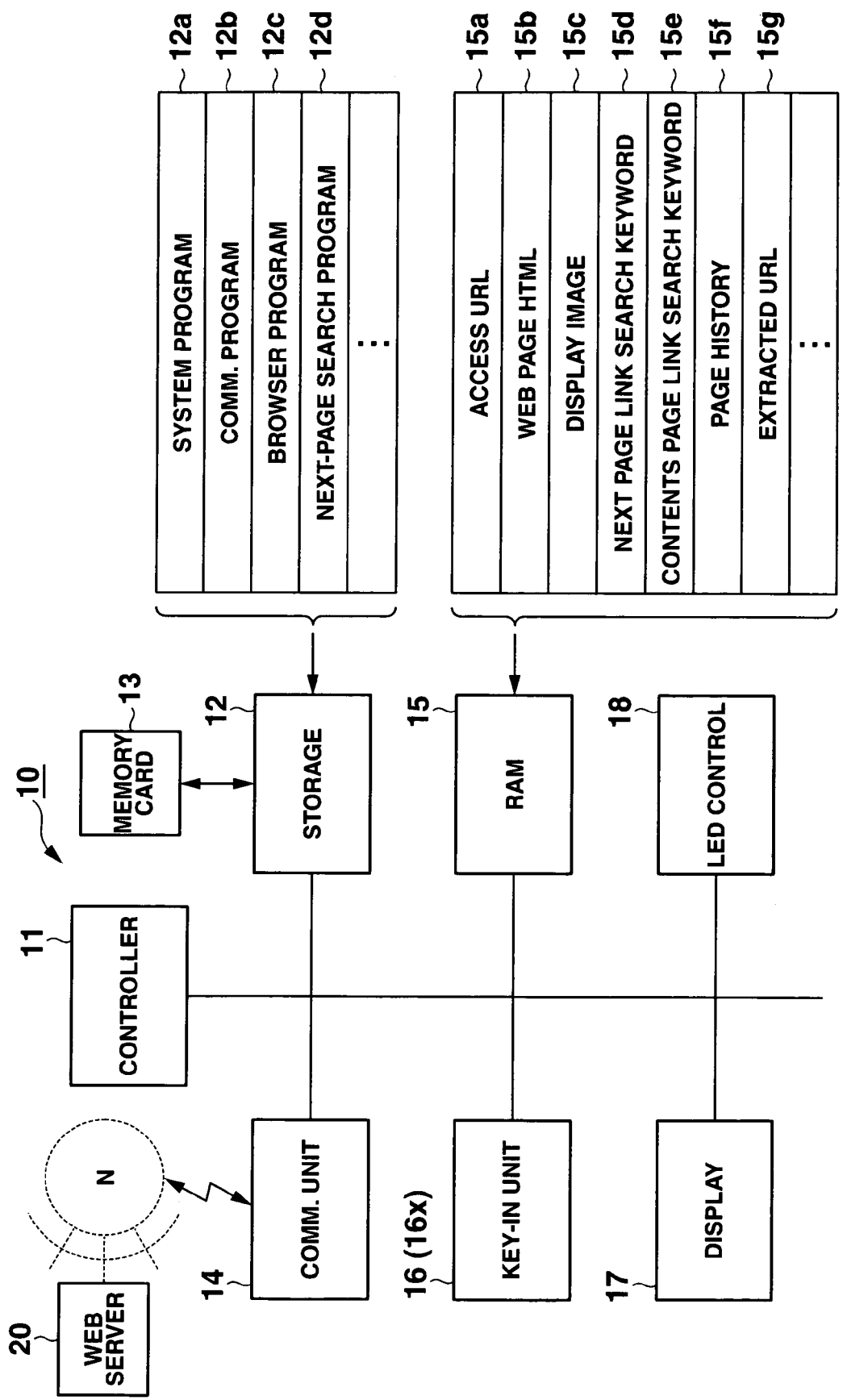
FIG. 1 is a block diagram of an electronic circuit for a portable terminal apparatus as one embodiment of the present invention.
Figure 2A:
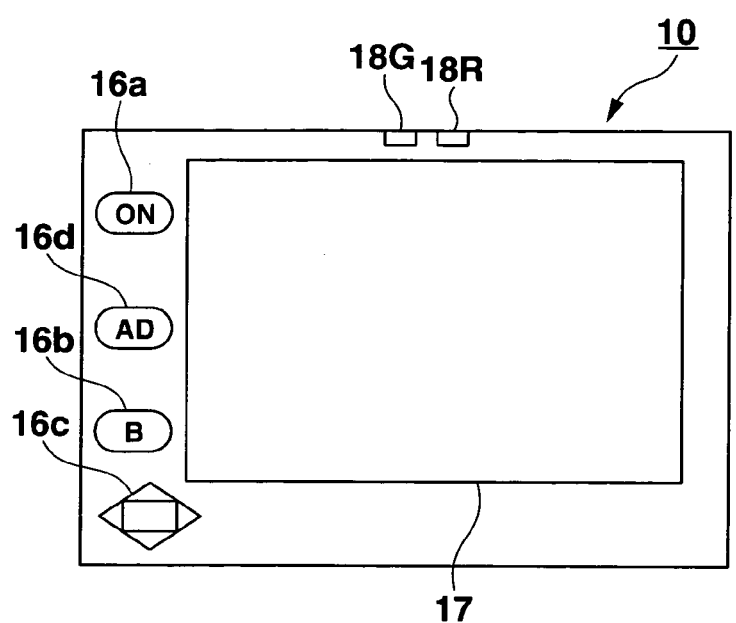
FIGS. 2A and 2B are front and right side views, respectively, of the terminal apparatus.
Figure 2B:
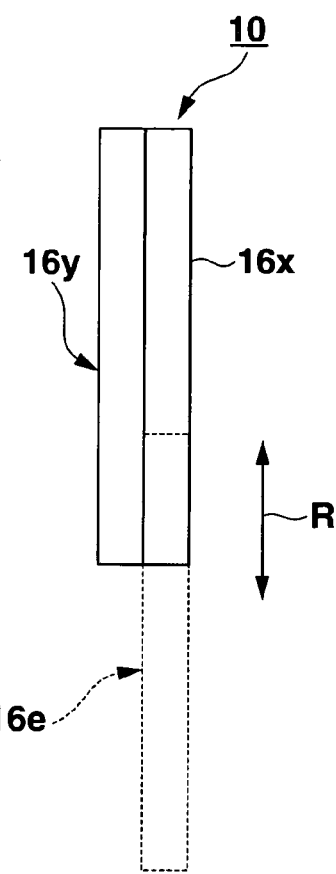

FIG. 1 is a block diagram of an electronic circuit for a portable terminal apparatus 10 to which the present invention is applied. FIGS. 2A and 2B are front and right side views, respectively, of the terminal apparatus 10.

The terminal apparatus 10 is either a PDA (Personal Digital Assistant) or a mobile telephone with a Web page browsing function or a portable apparatus composed only for Web page browsing purpose. The apparatus 10 may comprise a computer that reads a program recorded on one of various recording media or a received program and that is controlled by the program. The electric circuit of the apparatus 10 comprises a controller composed of a CPU (Central Processing Unit) 11.

The controller 11 controls operation of the respective circuits of the apparatus 10 using a RAM 15 as a working memory in accordance with a control program stored beforehand in a storage device 12 such as a flash ROM, a control program read from an external recording medium such as a memory card (or ROM card) 13 into the storage device 12, or a control program read into the storage device 12 from a Web server (in this case, a program server) 20 on the Internet (or communication network) N. The control program stored in the storage device 12 is started up in accordance with an input signal given by a user at a key-in unit 16 that includes a slidable keyboard 16X or a communication signal communicated between the terminal apparatus 10 and each Web server 20 on the Internet N to which the terminal apparatus 12 is connected through a communication unit 14.

The controller 11 is connected to the storage device 12, communication unit 14, RAM 15, key-in unit 16 (16X), a display made of an LCD 17, and an LED control unit 18. As shown in FIG. 2A, the LED control unit 18 flashes green and red LEDs 18G and 18R provided at an upper center of the front of the terminal apparatus 10 for ascertaining the acquisition of a Web page.

The storage device 12 has stored a system program 12a that controls operation of the whole terminal apparatus 10, a communication program 12b that is used for data communication between the terminal apparatus 10 and the respective Web servers 20 on the Internet (or communication network) N through the communication unit 14, a browser program 12c to display a Web page (see FIG. 6) obtained from a Web server 20 on the Internet N, and a next-page search program 12d to easily and rapidly shift a display from the presently displayed Web page to a next Web page.

As shown in FIG. 2A, the key-in unit 16 comprises a "power source" key 16a operated to turn on/off a power source (not shown), a browser start-up "B" key 16b operated to start up the browser program 12c, a group of cursor keys 16c operated to move a cursor pointer on the display picture, and an advance "Ad" key (or button) 16d operated to advance a display from a Web page under display to a next one, all of these keys being disposed to the left of the display 17.

As shown in FIG. 2B, the terminal apparatus 10 is sized enough to be held by a user's single hand. As shown by a double-headed arrow R in FIG. 2B, the back part of the apparatus case comprises the downward slidable keyboard 16X, which has thereon alphanumerical/sign keys 16e used to input any characters/signs to the apparatus 10. Reference numeral 16Y denotes the front or display side of the case. All the keys (or buttons) 16a-16e of the key-in unit 16 (or 16X) are sized, and shaped and arranged so as to allow the user to operate them with his or her single hand.

The RAM 15 comprises working memory areas such as an URL memory 15a, a HTML memory 15b, a display image memory 15c, a next-page link search keyword memory 15d, a contents page link search keyword memory 15e, a history memory 15f, and an extracted URL memory 15g.

The URL memory 15a stores the URL of an access destination Web server 20 on the Internet (or communication network) N. The HTML memory 15b stores a HTML file (see FIG. 7) obtained from the Web server 20 in accordance with the URL of the access destination. The display image memory 15c stores data on an image to be displayed on the display screen 17, for example, image data of a Web page (see FIG. 6) to which the HTML file (see FIG. 7) is converted in accordance with the browser program 12c.

FIG. 3 illustrates the content of data stored in the next-page link search keyword memory 15d prepared in the RAM 15. This memory 15d stores in this order a plurality of keywords "next/advance/page/ . . . " to extract an URL of the next Web page from the HTML file (see FIG. 7) of the Web page presently under display (see FIG. 6) stored in the HTML memory 15b.

FIG. 4 illustrates data stored in the contents page link search keyword memory 15e prepared in the RAM 15. The memory 15e stores in this order a plurality of keywords "contents/index/list/cover" to extract the URL of the contents page from the HTML file (see FIG. 7) of the Web page presently under display (see FIG. 6) stored in the HTML memory 15b.

FIG. 5 illustrates the content of data stored in the history memory 15f of in the RAM 15. The history memory 15f has stored a history of the Web pages displayed so far, that is, the operations each for jumping from a Web page to a different one, as used so far, and the URLs of the different pages in corresponding relationship. The operations include one of specifying a bookmark in which the URL of a user's desired Web page is beforehand registered, one of specifying with a cursor pointer a link button on the presently displayed Web page, and one of operating the "Advance" key 16d.

A URL of a "next page" or a URL of the "contents" page is automatically extracted from the HTML file (see FIG. 7) of the presently displayed Web page (see FIG. 6) and stored in the extracted URL memory 15g in the Web page display process (see FIG. 8) to be performed by operating the "Advance" key 16d (see FIGS. 9 and 10).

In the portable apparatus 10 of this embodiment, texts following the last sign "/" of the URL of a Web page to be accessed or linked with are hereinafter referred to as a "file name" and texts preceding the last signs "/" are hereinafter referred to as a "directory". For example, concerning URL="http://www.asio.co.jp/product/a/page01.htm", the file name is "page01.htm" and the directory name is "product/a".

Figure 6:
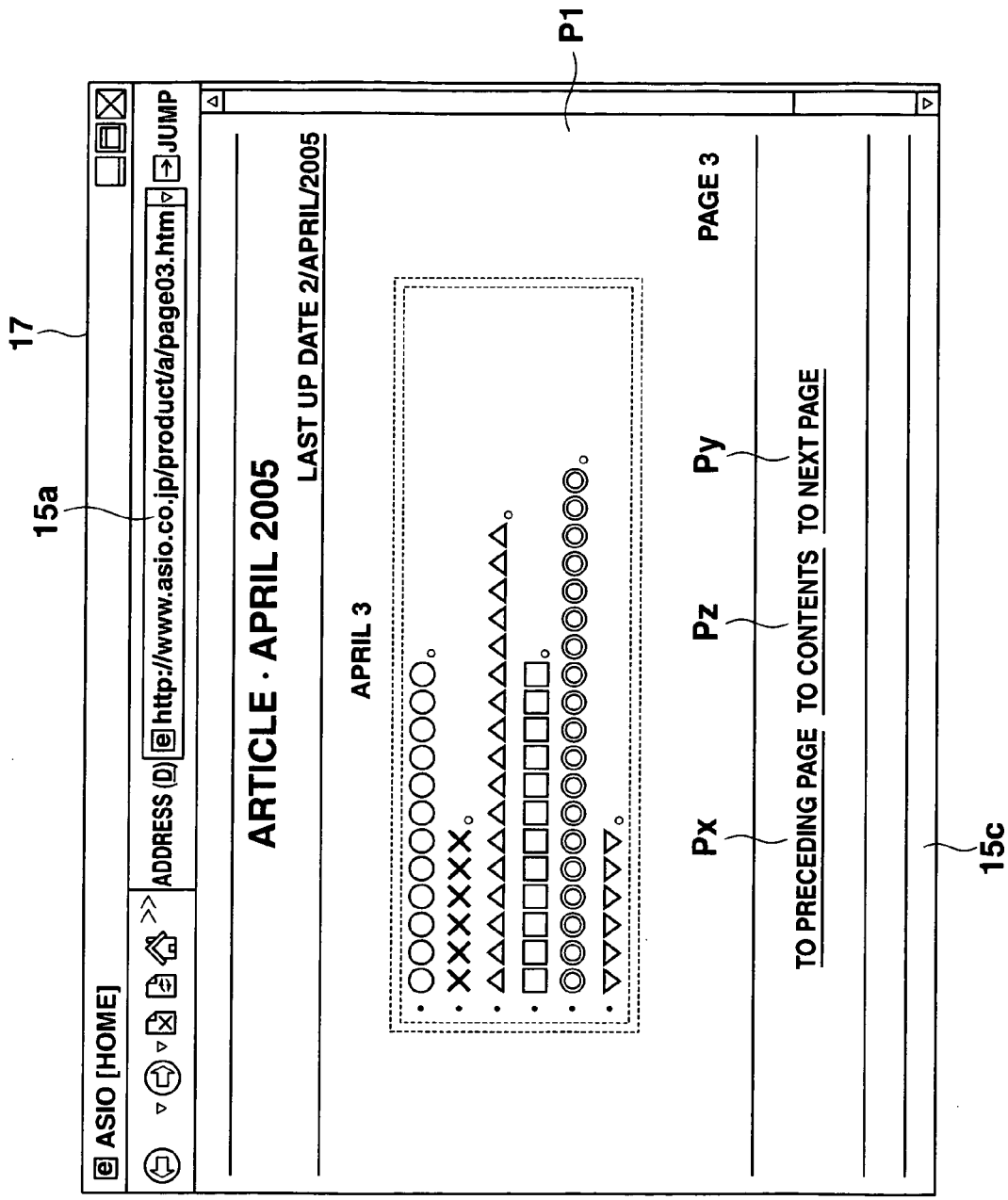
FIG. 6 illustrates a Web page displayed on a browser picture based on a browser processing operation of the terminal apparatus.

FIG. 6 shows a Web page P1 represented by an access destination URL [http://www.asio.co.jp/product/a/page003.htm] 15a displayed on the browser picture BR in the browser processing operation of the terminal apparatus 10.

FIG. 7 illustrates the content of a HTML file 15b written in HTML as a markup language composing the Web page P1 of FIG. 6. That is, characters and images 15c on the Web page P1 displayed on the browser picture BR are obtained by the browser processing operation of the source codes written in the HTML file 15b.

For example, in order to display a next-page link button "To Next page" Py on the Web page P1, a character string of the next page link button Py is written as a source code:
[<A href="http://www.asio.co.jp/product/a/page004.htm"> to next page </A>] Cy.

Also, in order to display the preceding page link button "To Preceding page" Px on the same Web page P1, a character string of the preceding page link button Px is written as a source code:
[<A href="http://www.asio.co.jp/product/a/page002.htm"> to preceding page </A>] Cx.

In order to display the contents page link button "To Contents page" Pz on the same Web page P1, a character string of the contents page link button Pz is written as a source code:

[<A href="http://www.asio.co.jp/product/a/index.htm"> to contents page </A>] Cz.

That is, according to the Web page display function of the terminal apparatus 10, when the "Advance" key 16*d* is operated, for example, on the browser picture BR displaying the web page P1 of FIG. 6, a link destination URL:

http://www.asio.co.jp/product/a/page004.htm written in the source code Cy containing the word "next" is extracted from the HTML file 15*b* of FIG. 7, and a next Web page (with page0004.html) following the presently displayed Web page (with page003.html) can be displayed by operating the "Advance" key (or button) 16*d*.

Figure 8:
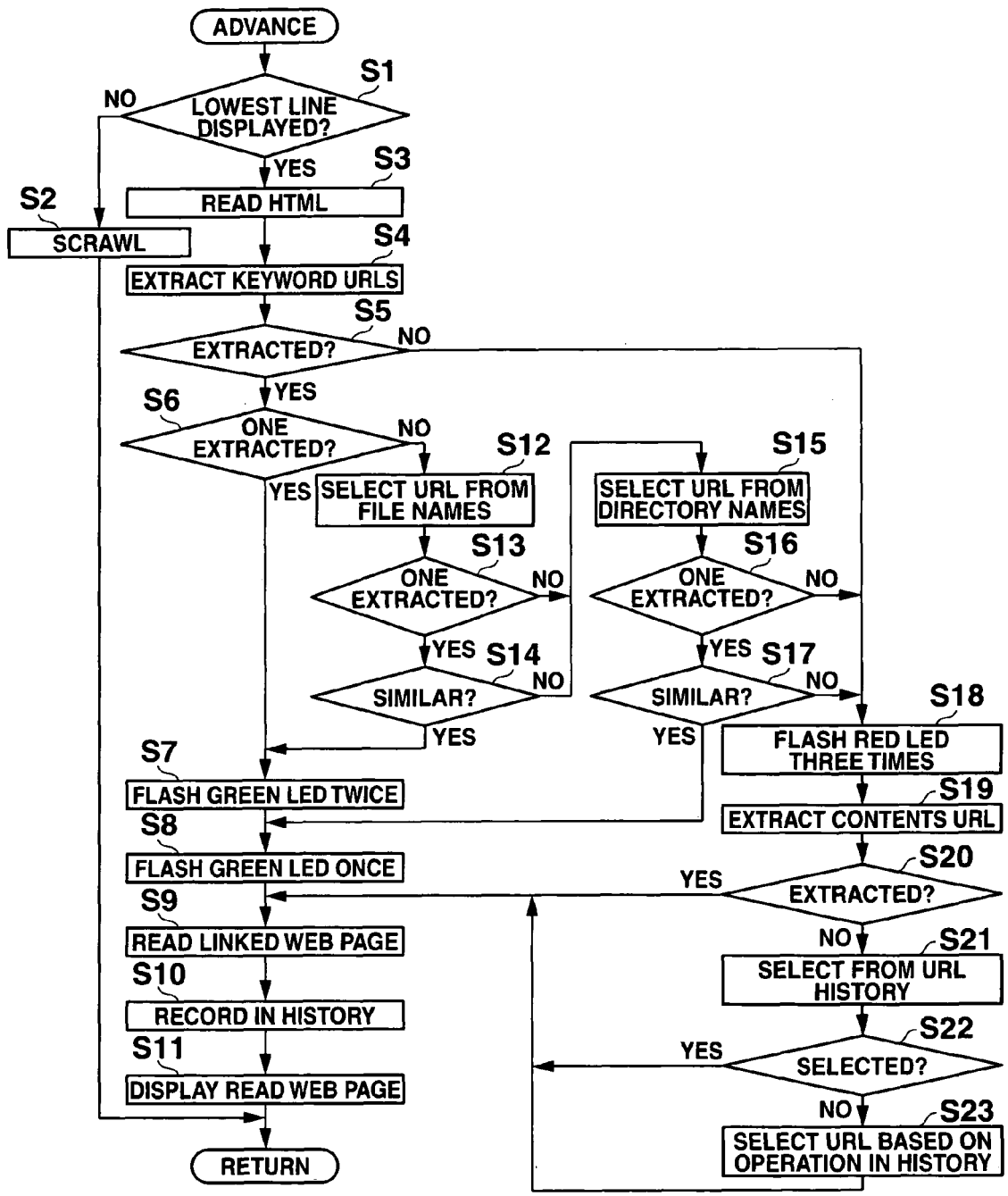
FIG. 8 is a flowchart of a Web page displaying process performed in a first embodiment.

The Web page display function of the terminal apparatus 10 will be written next. FIG. 8 is a flowchart of the Web display process of the first embodiment to be performed when the "Advance" key is operated.

When a browser startup "B" key 16*b* of the key-in unit 16 is operated, the browser program 12*c* is started up, a HTML file 15*b* is acquired from a "Web server 20 connected in accordance with the URL stored in the URL memory 15*a*, and then a corresponding Web page is displayed on the browser picture BR. When in this state the "Advance" key 16*d* of the key-in unit 16 is operated, it is then determined whether the lowest end of the Web page is displayed presently on the display unit 17 (step S1).

If not, the Web page is scrawled downward and then displayed (step S1→S2).

When it is then determined that the lowest end of the Web page is displayed, a HTML file corresponding to the presently displayed Web page stored in the HTML memory 15*b* of the RAM 15 is read (step S1→S3). Then, the HTML file is searched for keywords stored in the next-page link search keyword memory 15*d* (see FIG. 3) matching, for example, character strings "next", "advance", etc. When a matching keyword is searched out, its URL written in the source code is then extracted and stored in the extracted URL memory 15*g* (step S4).

When one character string is matched with one of the keywords stored in the next-page link search keyword memory 15*d* and a corresponding URL written with the character string is extracted (Step S5→S6), the green LED 18G provided at an upper center of the front of the terminal apparatus 10 is then flashed three times (two times+once) by the LED control unit 18, thereby notifying the user that an appropriate next page will be displayed (step S6→S7, S8).

Then, the URL stored in the extracted URL memory 15*g* is written into the URL memory 15*a*, and a HTML file of a Web page is read from a Web server 20 corresponding to the link destination URL (step S9).

Then, the jumping operation (involving operation of the "Advance" button), as used this time, and the extracted URL are recorded in corresponding relationship in the history memory 15*f* (see FIG. 5) of the RAM 15 (step S10). Then, a next Web page based on the HTML file read in step S9 is displayed on the display screen 17 (step S11).

When the presently displayed Web page contains a plurality of next-page link search keywords, a plurality of character strings are matched with the keywords and a plurality of URLs written with the keywords are extracted in step S4. Then the extracted URLs are stored as shown in FIG. 9. FIG. 9 shows only file names of the stored plurality of URLs whose common directory is omitted. When the plurality of URLs are stored as just described above, the determination in step S6 is NO. Then, from among the plurality of URLs a URL is selected which is next in order to that of the presently displayed page and more particularly whose page number or sign written in the file name thereof most closely follow those of the URL of the presently displayed page (step S6→S12).

When one URL following that of the presently displayed page is extracted, it is determined whether the file name of the extracted URL is similar to the presently displayed URL file name (step S13→S14). If so (YES in step S14), the green LED 18G is flashed three times by the LED control unit 18, thereby notifying the user that an appropriate next page will be displayed (steps S7, S8). Then, a Web server 20 corresponding to the selected URL is accessed and the HTML file of a Web page thereof is read (step S9).

The page jumping operation used this time and the extracted URL are recorded in corresponding relationship in the history memory 15*f* (see FIG. 5) of the RAM 15 (step S10). Then, a next Web page corresponding to the HTML file read in step S9 is displayed on the display 17 (step S11).

When it is determined in step S14 that the extracted URL file name is not similar to that displayed presently, or that even no one URL can be selected from the plurality of URLs based on their file names (No in step S13), a URL is selected, which is next in order to that of the presently displayed page and more particularly whose page number or sign written in the directory name thereof most closely follow those of the URL of the presently displayed page, from among the plurality of URLs (step S15).

FIG. 10 illustrates an example of extracted URLs from the file names of which no one URL can be selected. In this example, a plurality of pages are given the same file name "indext.htm". In this case, no appropriate file name can be selected and a desired URL is selected by referring to the directory names.

After a URL is selected in step S15, it is then determined whether the selected URL directory name is similar to that of the URL displayed presently page (step S16→S17).

When it is determined that the URL following that of the presently displayed page is selected and similar in directory name to the presently displayed URL (Yes in step S17), the green LED 18G is then flashed once by the LED control unit 18, thereby notifying the user that a next page appropriate to some extent will be displayed (steps S7, S8). Then, a Web server 20 corresponding to the selected URL is accessed and the HTML file of the Web page thereof is read (step S9).

The page jumping operation used this time and the URL extracted this time are then recorded in corresponding relationship in the history memory 15*f* (see FIG. 5) of the RAM 15 (step S10). Then, a next Web page corresponding to the HTML file read in step S9 is displayed on the browser picture BR based on the HTML file (step S11).

When it is determined in step S17 that the extracted URL is not similar to the presently displayed URL (NO in step S17) or it is determined in step S16 that even no one URL can be selected from the plurality of link destination URLs stored in the extracted URL memory 15*g*2 (NO in step S16), the red LED 18R is flashed three times by the LED control unit 18, thereby notifying the user that the presently displayed Web page will be regarded as the last one (step S18).

Then, in order to jump to the contents Web page, the HTML file 15*b* of the presently displayed Web page is searched for character strings matching keywords "contents", "index", etc., stored in the contents page link search keyword memory 15*e* of FIG. 4 (step S19).

When an URL indicative of the contents page is extracted (step S20), a HTML file of its Web page is read from a Web server 20 corresponding to the URL (step S9).

Then, the page jumping operation used this time and the URL extracted this time are recorded in corresponding relationship in the history memory 15*f* (see FIG. 5) of the RAM 15 (step S10). Then, a contents Web page corresponding to the HTML file read in step S9 is displayed on the display device 17 (step S11).

When no URL indicative of the contents page is extracted in step S20, one is selected from among the URLs stored in the history memory 15f in order to return to the diverging-point Web page (step S21). That is, in this step the history of the Web page URLs is searched back, starting with the presently displayed Web page, for an URL of a Web page having a directory name different from that of the presently displayed Web page, or involving the diverging point to the presently displayed Web page. When that URL is searched out, it is then selected as such.

When the URL of the Web page involving the diverging point is selected from the URL history (step S22), a Web server 20 corresponding to that URL is accessed and the HTML file of the Web page involving the diverging point is read (step S9).

The page jumping operation used this time and the URL selected this time are recorded in corresponding relationship in the history memory 15f (step S10). Then, the Web page involving the diverging point read in step S9 is displayed on the display device 17 based on the HTML file of the Web page (step S11).

When in steps S21 and S22 the URL of the Web page involving the diverging point cannot be obtained, the history of the page jumping operation involving up to the presently displayed Web page stored in the history memory 15f is searched back for a URL of the destination Web page to which a jump was made in the past in a page jumping operation (for example, using the "cursor pointer") different from the presently employed one using the "Advance" key (or button). When that URL is searched out, it is selected as the URL of the Web page involving the diverging point to the presently displayed Web page (step S23).

Then, in a manner similar to that mentioned above, a HTML file of the Web page corresponding to the URL involving the diverging point is read (step S9). Then, the page jumping operation used this time and the URL selected this time are recorded in the history memory 15f (step S10). Then, the diverging point Web page read in step S9 is displayed on the display screen 17 (step S11).

While if the lowest edge of the picture is not displayed when the "Advance" key is operated in the processing of FIG. 8 the displayed picture is scrawled such that the lowest edge of the picture is displayed, two separate keys "Scrawl" and "Advance" may be provided such that as soon as the "Advance" key is operated, a page jump is made from the presently displayed page to a next page.

Thus, according to the Web page displaying function of the first embodiment, even the terminal apparatus 10 with a small display screen can display the respective Web pages subsequent to the presently displayed Web pages easily and in good order by operating the "Advance" key 16d only once without requiring any troublesome scrawling operations. And, even when the presently displayed Web page is the last of a series of Web pages, the contents Web page or the diverging-point Web page is selected and displayed appropriately.

Second Embodiment

The terminal apparatus 10 of the second embodiment has a next page allocation function. In the next page allocation function of the second embodiment, the URL of a candidate Web page to be displayed next is obtained either by extracting the linked URL written in the presently displayed HTML file or by changing an order-indicating number or sign included in the file name of the present access destination URL. The URL obtained is then accessed, thereby reading the HTML file of a Web page thereof. Then, link beforehand read keywords are extracted from the read Web page HTML file and the presently displayed HTML file. Then, it is determined which of both the HTML files is earlier in order or which of the order-indicating number or signs included in both the URLS is earlier in order. Then, the URL of a page involving the HTML file determined to be earlier set as a destination URL to be linked to when the "Advance" key 16d is operated.

FIG. 11 shows the content of data stored in the link beforehand read keyword memory 15h provided in the RAM 15 in the next page allocating function involving the Web page display in the second embodiment. The memory 15h has an area in which keywords such as "chapter W, section X, sub-section Y, paragraph Z", "volume X" and "page X" indicative of an order of a Web page are stored and order values of the respective keywords are temporarily stored.

Figure 12:
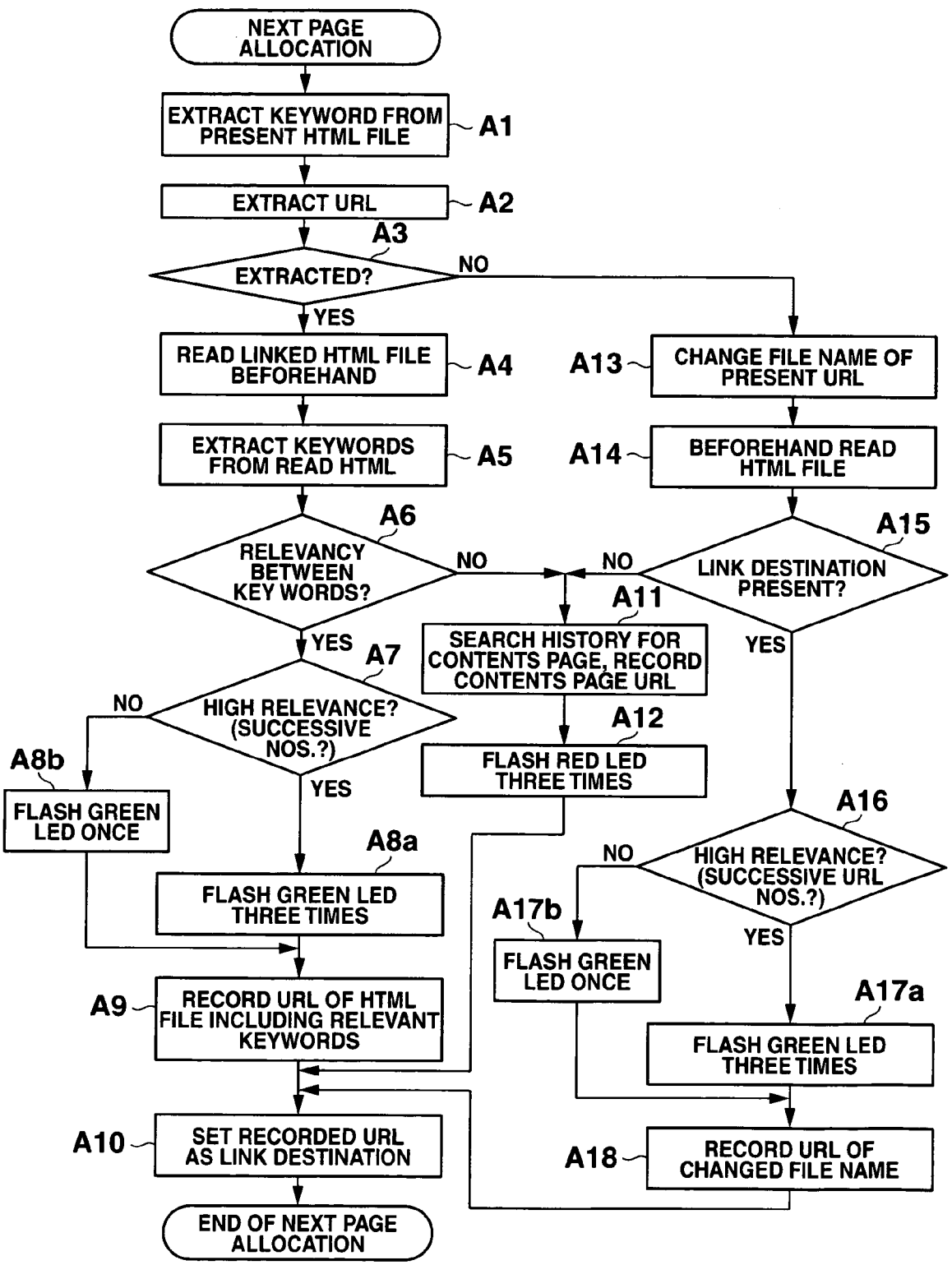
FIG. 12 is a flowchart of the next page allocating process.

FIG. 12 is a flowchart indicative of a next-page allocating process involving the display of a Web page in the second embodiment. When the browser startup "B" key 16b is operated, the browser program 12c is started up, and the apparatus is connected to a Web server 20 in accordance with a corresponding URL stored in the URL memory 15a. Then, a corresponding HTML file 15b is acquired from the Web server 20, and when a corresponding Web page is displayed on the browser picture BR, keywords such as "chapter W, section X, subsection Y, paragraph Z", "volume X", and "page X" recorded in the link beforehand read keyword memory 15h are extracted from the displayed HTML file (step A1). Then an URL linked to another Web page is extracted (step A2).

When it is determined that there is the linked URL in the HTML file in the displayed page (YES in step A3), the HTML file of a Web page of the linked URL is read beforehand from a corresponding Web server 20 on the Internet N (step A3→A4), and then keywords stored in the link beforehand read keyword memory 15h are extracted from the read HTML file (step A5).

When it is determined in step A6 that a keyword extracted from the read beforehand HTML file in step A5 and the keyword extracted from the presently displayed HTML file in step A1 are, for example, the same "volume" (YES in step A6), it is then determined whether or not they are highly relevant depending on whether or not their order-indicating number signs "X" are successive (step A7).

When the determination is affirmative in step A7, the green LED 18G is flashed three times, thereby notifying the user that an appropriate linked URL is extracted (step A7→A8a) Then, the URL of the HTML file including the keyword determined to be highly relevant is stored in the RAM 15 (Step A9) and set as a link destination URL to be selected when the "Advance" key 16d of the key-in unit 16 is operated (step A10).

When the determination is negative in step A7, the green LED 18G is flashed once, thereby notifying the user that a linked URL to some extent appropriate is extracted (step A7→A8b) Then, the URL of the HTML file including the keyword determined to be not highly relevant is recorded in the RAM 15 (step A9) and set as a link destination URL to be selected when the "Advance" key 16d is operated (step A10).

When it is determined in step A6 that both the keywords are different (or, for example, "volume X" and "page X", respectively) and not relevant (NO in step A6), the URL history recorded so far in the RAM 15 is searched back for the URL of the contents page by comparing the URL of the presently displayed page with the respective URLs of the history, thereby recording the URL of the contents page in the RAM 15 (step A11).

Then, the red LED 18R is flashed three times, thereby notifying the user that the presently displayed Web page is the last one (step A12), and the URL of the contents page recorded in the RAM 15 is set as a link destination URL to be selected when the "Advance" key 16d is operated (step A10).

When it is determined in step A3 that no linked URL is written in the HTML file of the presently displayed page, an order-indicating number or sign in the file name of the presently displayed Web page URL 15a is changed to a next subsequent one (step A3→A13). Then, the HTML file is read beforehand from the corresponding Web server 20 on the Internet N, using the URL of the changed file name as a link destination URL (step A14).

When the HTML file of a Web page indicated by the changed URL is read and it is determined that the changed URL is present as a link destination (YES in step A15), it is determined whether the changed URL is highly relevant to the URL of the presently displayed page depending on whether the order-indicating number or sign included in the file name of the changed link destination URL is next to that included in the file name of the URL of the presently displayed page (step A16).

If so, the green LED 18G is flashed three times, thereby notifying the user that an appropriate link destination is extracted (step A16→A17a). Then, the URL of the changed file name determined to be highly relevant is recorded in the RAM 15 (step A18) and set as a link destination URL to be selected when the "Advance" key 16d is operated (step A10).

When it is determined in step A16 that the changed link destination URL is not highly relevant to the presently displayed page, the green LED 18G is flashed once, thereby notifying the user that a link destination appropriate to some extent is extracted (step A16→A17b). Then, the link destination URL determined to be not highly relevant is recorded in the RAM 15 (step A18) and set as a link destination URL to be selected when the "Advance" key 16d is operated (step A10).

When it is determined in step A15 that no jump can be made from the presently displayed page to the Web page indicated by the changed URL and that no changed URL is present as a link destination (NO in step A15), the URL link history recorded so far in the RAM 15 is searched back for the URL of the contents page by comparing the respective URLs of the history with the presently displayed page URL, and then the URL of the contents page is recorded in the RAM 15 (step A11).

Then, the red LED 18R is flashed three times, thereby notifying the user that the presently displayed Web page is the last one (step A12). Then, the URL of the contents page recorded in the RAM 15 is set as a link destination URL to be selected when the "Advance" key 16d is operated (step A10).

Each of the Web page displaying methods performed by the portable apparatus 10 in the respective embodiments including the Web page displaying process of the first embodiment shown in the flowchart of FIG. 8 and the next-page allocating process involving the Web page display of the second embodiment shown in the flowchart of FIG. 12 can be stored and distributed as programs executable by computers in an external recording medium 13 such as a memory card (such as a ROM or RAM card), a magnetic disk (such as a floppy disk or a hard disk), an optical disk (such as a CD-ROM or a DVD), or a semiconductor memory. Various computer terminals having a Web linking function and a browser function can read a program stored in the external recording medium 13 into the storage device 12 and controlled by the read program so as to perform the Web page display function and the next-page allocating function involving the Web page display as described in the aforementioned embodiments, thereby performing processes similar to those mentioned above.

Data on the programs to perform the various aforementioned processes can be transmitted in the form of a program code through the communication network (or the Internet) N. The program data can be captured from the computer terminal (or program server) 20 connected to the communication network (or the Internet) N, thereby performing the web page display function and the next-page allocating function involving the Web page display.

Various modifications and changes may be made thereto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-192836 filed on Jun. 30, 2005 and including specification, claims, drawings and summary. The disclosure of the above Japanese patent application is incorporated herein by reference in its entirety.

What is claimed is:

1. An electronic apparatus comprising:
   Web page browsing means for acquiring a file written in a markup language from a Web server on a network, and displaying a corresponding Web page;
   keyword storage means for storing a plurality of keywords including at least a word "next";
   an operation key for giving a command to display a next page;
   URL extracting means for retrieving at least one of the keywords stored in the keyword storage means from the file written in the markup language corresponding to the displayed Web page in response to an operation of the operation key, and for extracting a linked URL written to correspond to the retrieved keyword;
   next-page displaying means for displaying, as the next page, a Web page acquired by the Web page browsing means by accessing the URL extracted by the URL extracting means;
   operation history storage means for sequentially storing URLs of Web pages displayed in response to respective user operations and data indicating the respective user operations in a corresponding relationship;
   diverging-point URL selecting means for, when the URL extracting means retrieves no keywords matching the keywords stored in the keyword storage means from the file, selecting the URL of a Web page which became a diverging point based on the user operations stored in the operation history storage means; and
   diverging-point page displaying means for displaying, as the next page, the Web page that became the diverging point indicated by the URL selected by the diverging-point URL selecting means.

2. The electronic apparatus of claim 1, further comprising URL selecting means for, when the URL extracting means extracts a plurality of URLs, selecting one URL from the extracted plurality of URLs based on a URL of the presently displayed page,
   wherein the next-page displaying means displays, as the next page, a Web page indicated by the URL selected by the URL selecting means when the URL extracting means extracts a plurality of URLs.

3. The electronic apparatus of claim 2, further comprising contents page retrieving means for, when the URL extracting means retrieves no keywords matching the keywords stored in the keyword storage means from the file, retrieving a URL indicating a contents page from the file corresponding to the presently displayed Web page; and contents page displaying means for displaying, as the next page, the contents page indicated by the URL retrieved by the contents page retrieving means;

wherein the diverging-point URL selecting means selects the URL of the Web page which became the diverging point when the URL extracting means retrieves no keywords matching the keywords stored in the keyword storage means from the file and when the contents page retrieving means does not retrieve the contents page.

4. A non-transitory computer readable recording medium having a Web page browsing program stored thereon that is executable by a computer of an electronic apparatus to control the apparatus to acquire a file written in a markup language from a Web server on a network, and to display a corresponding Web page, the apparatus comprising an operation key for giving a command to display a next page, the program controlling the computer to function as:

keyword storage means for storing a plurality of keywords including at least a word "next";

URL extracting means for retrieving at least one of the keywords stored in the keyword storage means from the file written in the markup language corresponding to the displayed Web page in response to an operation of the operation key, and for extracting a linked URL written to correspond to the retrieved keyword;

next-page displaying means for displaying, as the next page, a Web page acquired by accessing the URL extracted by the URL extracting means;

operation history storage means for sequentially storing URLs of Web pages displayed in response to respective user operations and data indicating the respective user operations in a corresponding relationship;

diverging-point URL selecting means for, when the URL extracting means retrieves no keywords matching the keywords stored in the keyword storage means from the file, selecting the URL of a Web page which became a diverging point based on the user operations stored in the operation history storage means; and diverging-point page displaying means for displaying, as the next page, the Web page that became the diverging point indicated by the URL selected by the diverging-point URL selecting means.

* * * * *